NUCLEAR REACTOR ROD CONTROLLER
Filed May 10, 1967 2 Sheets-Sheet 1
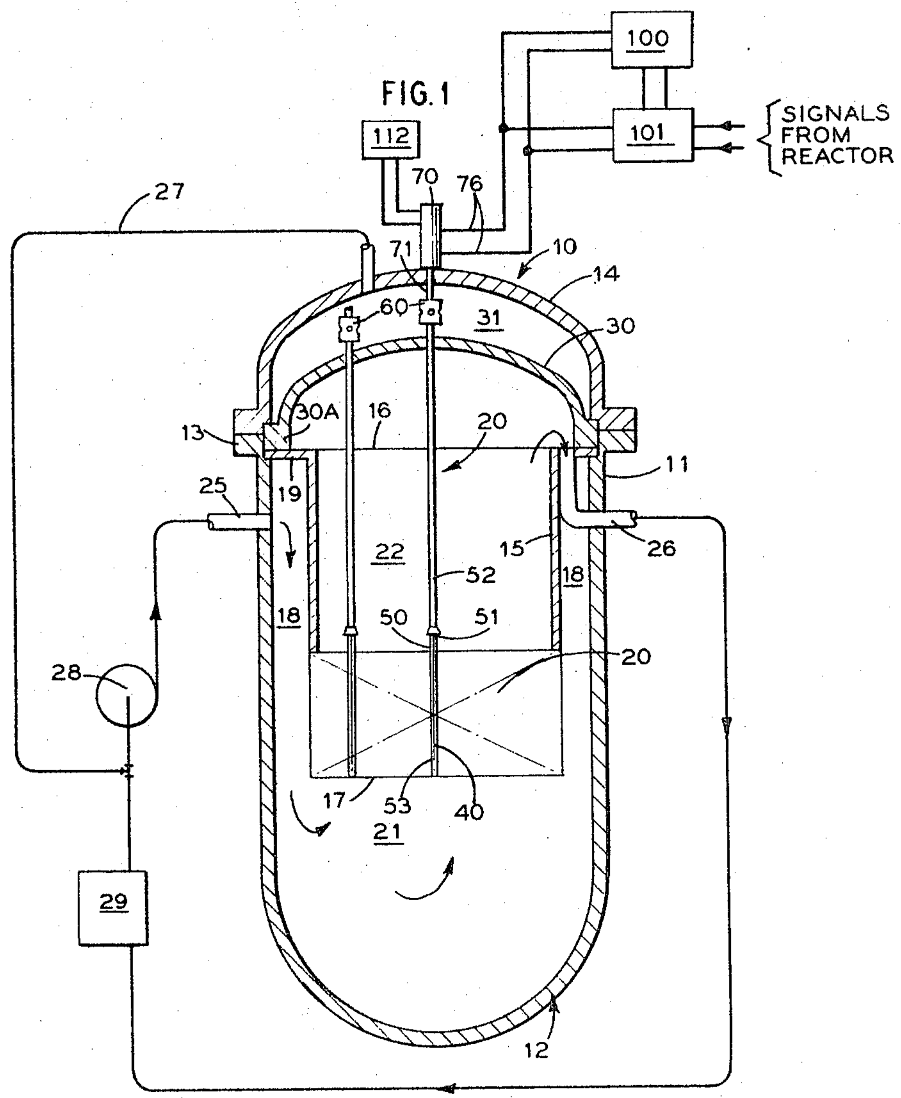
INVENTOR.
Felix S. Jabsen
BY
ATTORNEY NUCLEAR REACTOR ROD CONTROLLER
Filed May 10, 1967 2 Sheets-Sheet 2
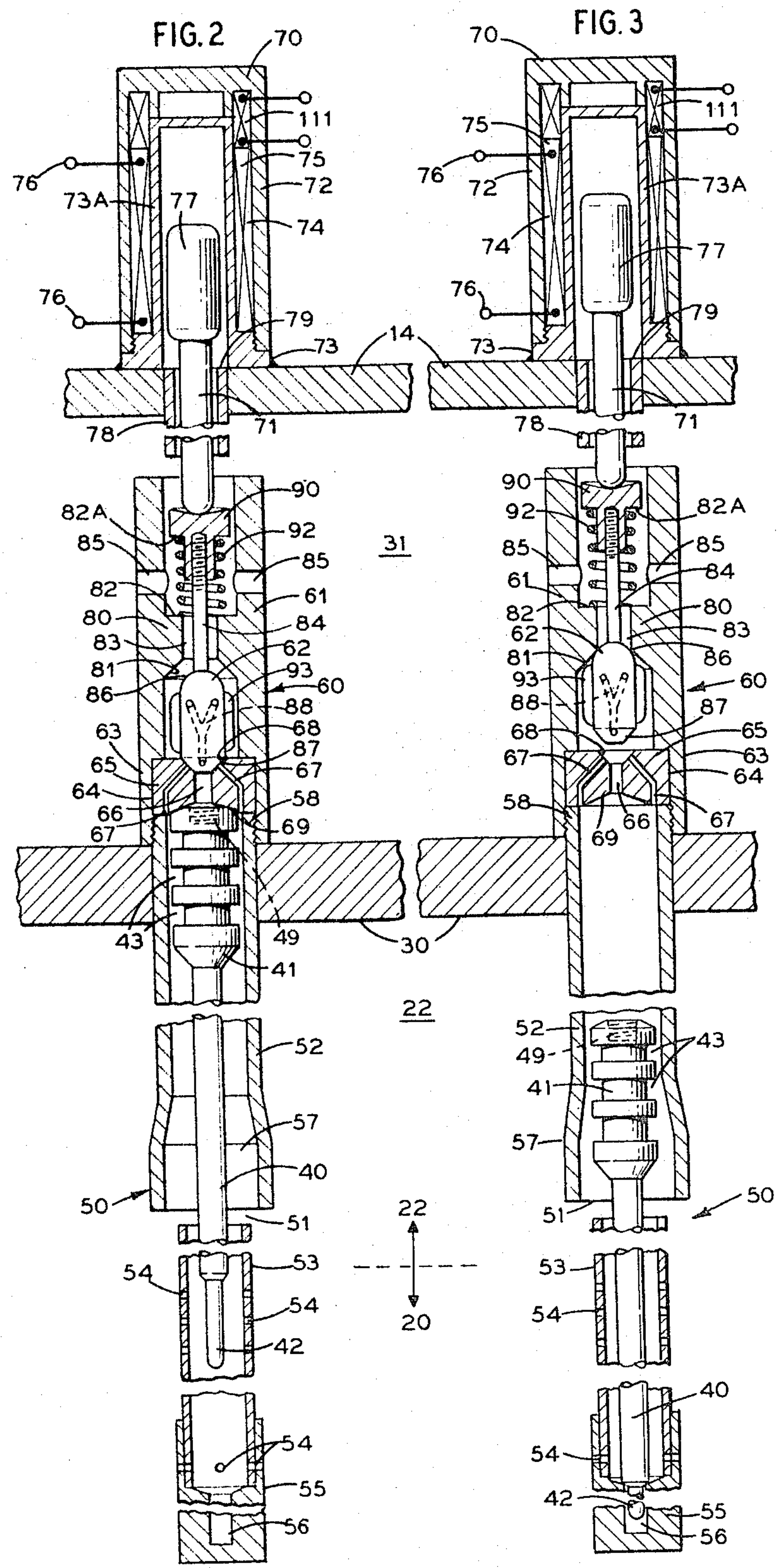

United States Patent Office 3,462,345 Patented Aug. 19, 1969

3,462,345
NUCLEAR REACTOR ROD CONTROLLER

Felix S. Jabsen, Lynchburg, Va., assignor to The Babcock & Wilcox Company, New York, N.Y., a corporation of New Jersey Filed May 10, 1967, Ser. No. 637,527
Int. Cl. G21c 7/08
U.S. Cl. 176—36 10 Claims

ABSTRACT OF THE DISCLOSURE

An improved control arrangement for moving a nuclear reactor control rod in and out of a nuclear reactor core. The arrangement includes a guide tube partially disposed in the core and within which the control rod is axially movable. A removably mounted, spring loaded-closed, valve is associated with the guide for regulating the flow of primary cooling fluid therethrough. A removably mounted electromagnet, adapted to carry a push rod for actuating the valve, may be manually or automatically energized to normally open the valve. With the valve open, some of the coolant flows through the guide into a bypass chamber and, in so flowing, entrains the control rod for motion thereof out of the core. Deenergizing the electromagnet releases the valve for closing off the flow of fluid through the guide tube to allow the control rod to move into the core under the influence of gravity.

Background and summary of the invention

This invention relates to a control arrangement for actuating a nuclear reactor control rod, and more particularly to a simplified, easily maintained, fail safe arrangement for moving a control rod in or out of a nuclear reactor core.

A nuclear chain reaction is obtained by bombarding a fissionable fuel material with neutrons from a separate source to split some of the atomic nuclei of the fuel into fragments thereby releasing useful energy and other neutrons for bombarding nuclei, and so on, ad infinitum. For a chain reaction to take place, each fuel nucleus undergoing fragmentation must produce a minimum of one neutron on the average which in turn fragments another nucleus. The process, called fission, depends for its continuity on an adequate supply of neutrons and fuel. A nuclear reactor is designed so that a sufficient number of neutrons are available for the reactor to achieve the desired power levels.

In a typical nuclear reactor the fuel is disposed in close proximity to, and usually intermingled with, a moderating material for slowing down neutrons so that they possess the desired energy spectrum. The moderator, fuel and associated structural components are called a core. A heat transfer fluid, generally referred to as the primary coolant, is circulated through the core to remove heat generated by the fission process. In some reactors, the moderator is itself circulated through the core to serve as the primary coolant.

A control rod, which is a device having a large neutron absorption cross-section, is generally used for regulating the power level of the core. Since the control rod material absorbs and does not reproduce neutrons, the rods are usually removably inserted in the core to control the rate of production of neutrons therein. In practice, a plurality of control rods are provided to maintain different power levels. Inserting rods into the core removes neutrons from the useful fission process and extracting rods increases the number of neutrons available. The maximum power output of the reactor is achieved when all the rods are removed, minimum, when substantially all are inserted. Full insertion of all the control rods, e.g. scramming the rods, terminates the chain reaction.

Control rod actuators are provided to move the rods in and out of the core. Actuators of prior art have generally been complex, electro-mechanical units physically connected to the rods. Since they are expensive to fabricate, costly to maintain and subject to frequent breakdown, there has been a long felt need for a low cost, simply constructed and easily maintained actuator. Ease of maintenance is greatly increased by providing easy access to the actuators after they are installed in the reactor. The invention is particularly directed to providing easily removable and replaceable structure to meet the latter need.

Brief description of the drawings

FIG. 1 is a schematic of a typical reactor incorporating the inventive device;

FIG. 2 is an enlarged sectional elevation of an embodiment of the invention showing a control rod in the raised position;

FIG. 3 is an enlarged sectional elevation of the embodiment of FIG. 2 showing the control rod in the lowered position.

Description of the preferred embodiment

Referring now to the drawings wherein like reference characters designate like or corresponding parts throughout the several views there is shown in FIG. 1 a nuclear reactor 10 generally comprising a vertically oriented cylindrical shell 11 provided with a closed lower end 12 and open upper end terminating in a flange 13. The open end of the shell 11 is covered with an elliptically-shaped head 14 removably connected thereto.

A vertically oriented cylindrical container 15 having an open upper end 16 and a partially closed lower end 17, is concentrically disposed within the shell 11 to form an annular chamber 18 between the container 15 and shell 11. The upper end of the container 15 is provided with an annular rim 19 for connecting the container 15 to the shell 11. The container provides support for the nuclear fuel, moderating material and associated structure well known in the art for forming a fluid permeable reactor core 20.

It is seen that the core 20 is substantially centrally located within the shell, and with the container, defines outlet 22 and inlet 21 chambers above and below the core respectively. An inlet 25 is provided for the flow of primary coolant into the reactor, an outlet 26 for coolant flow out of the reactor. It is seen that the inlet 25 is disposed in fluid flow communication with the inlet chamber 21 through the annular chamber 18, and the outlet 26 is in fluid flow communication with the outlet chamber 22.

It is a feature of the invention to provide a generally elliptically-shaped inner head 30 having a flange 30A to connect the head 30 to the shell 11 for support. The inner head 30 is preferably disposed over the open upper end of the container 15, acting as a pressure tight cover therefor, and spaced apart from the reactor head 14 to form therewith a bypass chamber 31 for receiving primary coolant flowing thereinto from the outlet chamber 22. The bypass chamber 31 is substantially completely sealed off from the outlet chamber 22 by the inner head 30. As will hereinafter be more described, the bypass chamber 31 is controllably openable to the outlet chamber 22 for fluid flow communication therebetween.

The reactor 10 usually has a pump or pumps associated therewith, generally represented at 28, for continuously circulating primary fluid through the reactor. As shown in FIG. 1 a heat exchange device or devices, generally represented at 29, is also associated with the reactor to extract heat from the coolant for conversion to useful work. In a present day reactor that is not provided with the inventive device, coolant is continuously circulated by the pump 28 through the inlet 25, inlet chamber 21, fluid permeable core 20, outlet chamber 22, outlet 26 and heat exchange device 29, and then returned to the pump 28. Useful energy, in the form of heat generated by the fission process, is absorbed by the coolant as it circulates through the core 20 and given up as it circulates through the heat exchange device 29.

It is a feature of the invention to provide a fluid bypass conduit 27 interconnecting the bypass chamber 31 and the coolant circuit at a point where the fluid pressure is less than that of the outlet chamber 22. For example, the primary coolant circuit may be advantageously arranged so that coolant entering the bypass chamber 31 from the outlet chamber 22 does not flow through a heat transfer device 29. Instead, the coolant is returned directly to a pump 28. Under these circumstances the pressure difference between the outlet and bypass chambers 22, 31 is substantially equal to the pressure differential across the bypassed heat transfer device 29, the pressure within the bypass chamber being less than that of the outlet chamber. The difference in pressure between these chambers is used for hydraulically moving control rods out of the reactor core. As will hereinafter be more fully described, a passageway is formed by structure between the bypass and outlet chambers through which sufficient fluid may flow when the passageway is opened to hydraulically move the control rod away from the core. Further, structure is provided operatively associated with the passageway for closing the same to let the control rod remain in the reactor core under the influence of gravity. Additional structure operably associated with the closing structure normally opens the passageway to allow fluid to flow therethrough and maintains a portion of the passageway open to hold the control rod away from the core.

As shown in FIGS. 1 to 3, the inventive arrangement basically comprises a control rod 40 endwise movable in a guide tube 50 having an opening 51 formed therein for fluid communication with the outlet chamber 22. The guide tube 50 has an upper portion 52 carried and supported in place by the inner head 30 and a lower portion 53 carried and supported in place by the core 20. The upper portion 52 of the tube 50 extends through the inner head 30 and supports a valve assembly 60 removably mounted thereon. A removable electromagnet 70 externally mounted on the reactor head 14 carries a push rod 71 for opening the valve 60, and allowing some of the coolant from the outlet chamber 22 to flow into the bypass chamber 31 through the guide tube 50. Coolant flowing through the guide tube 50 entrains the control rod 40, moving it axially out of the lower portion 53 of tube. The control rod 40 is thus raised upwardly out of the core 20, allowing neutrons that would otherwise be absorbed by the rod to bombard the fuel. As a result, the power output of the reactor is incrementally increased over the output sustained prior to removal of the control rod from the core. The electromagnet 70 is normally continuously energized, as will hereinafter be more fully disclosed, for normally holding the control rod 40 out of the core 20, a position corresponding to normal power output. Deenergizing the electromagnet 70 releases the push rod 71 thereby allowing the valve 60 to close off the flow of coolant to the bypass chamber 31. Under the influence of gravity, the control responds by falling into the core. As a result, the power level of the reactor is incrementally decreased since the control rod absorbs neutrons that would otherwise enter into the fission process. In this invention the control rod is either fully inserted in the core or fully removed therefrom.

A plurality of control rods, each controlled as hereinbefore described, may be provided to afford a wide range of power levels, the summation of incremental changes in power level afforded by selectively moving some of the plurality of control rods being determinative of the power output of the reactor at any given time. The number of choices of power level available is proportional to the number of control rods provided. In the preferred arrangement, substantially all of the components are mass produceable, loose fitting components, and the arrangement is particularly adapted to control "scram" or "pin" type control rods well known in the art for rapidly shutting down a reactor.

FIG. 2 shows the inventive apparatus in greater detail and portrays in the relative position of the movable components when the control rod is withdrawn from the core. FIG. 3 is similar to FIG. 2, but shows the position of the movable components with the control rod inserted into the core. It is seen that the control rod 40 is an elongated member of circular cross-section having an enlarged upper end 41 and a reduced lower end 42. The functional characteristics of the ends 41, 42 will hereinafter be fully described.

The lower portion 53 of the guide tube is a vertically oriented elongated receptacle of U-shaped cross-section having a plurality of radially oriented openings 54 formed therein substantially throughout its longitudinal length for continuous passage of coolant thereinto to bathe the rod 40 with coolant. The bottom end of the lower portion 53 is covered by a cap 55 having a recess 56 receiving the reduced lower end 42 of the control rod. The cap 55 and rod end 42 cooperate with one another through the coolant medium to form a viscous damper for cushioning the fall of the control rod.

The upper portion 52 of the guide tube is a vertically oriented elongated annular member with a bell-shaped lower end 57 that opens into the outlet chamber 22 and an upper end 58 that protrudes into the bypass chamber 31 through the inner head 30. The upper end 58 is externally threaded for threadably mounting the valve assembly 60 thereon. The upper portion 52 of the guide tube has a larger internal diameter than the lower portion 53 since it is formed to movably accommodate the enlarged upper end 41 of the control rod. It is seen that the upper and lower portions 52, 53 of the guide tube are substantially axially aligned with one another and spaced apart to form the coolant opening 51. The upper end 41 of the rod has a plurality of axially aligned annular channels 43 formed therein for entrapping coolant flowing longitudinally of the rod 40. The channels 43 promote the entrainment of the rod in the coolant stream and tend to center the rod within the guide tube 50 for rapid axial motion therein.

The valve assembly 60 includes a circular valve body 61 of generally H-shaped longitudinal section. The body 61 is partially bored from either end to receive a valve 62 that is captured for axial motion therein. The lower end 63 of the valve body is counterbored 64 and partially internally threaded to threadably receive the upper end 58 of the guide tube. A circular member 65, having a centrally bored passageway 66 and having a plurality of elbow-shaped passageways 67 formed therethrough, is disposed within the counterbore 64 over the upper end 58 of the guide tube and concentric therewith. As best shown in FIG. 3, the member 65 is provided with opposing chamfered upper and lower seating surfaces, 68 and 69 respectively. Referring again to FIG. 2, the valve 62 is normally seated downwardly against the upper surface 68 of the member 65, the valve being held downwardly in place by the push rod 71 for maintaining the pressure differential across the control rod to hydraulically move the same upwardly for seating against the lower surface 69.

It is seen that the valve body 61 is provided with internally projecting lip 80 formed integrally with the body 61. A conical annular seating surface 81 formed on the lower side of the lip 80 for upwardly seating the valve 62, is opposed by a spring abutment surface 82 formed on the upper side of the lip 80. The lip 80 has an axial passageway 83 formed therethrough that is large enough to accommodate endwise motion of the valve stem 84 and passage of primary coolant therethrough. A plurality of radial passageways 85 formed through the upper end of the valve body 61 act as vents for coolant flowing from the axial passageway 83 and into the bypass chamber 31.

The valve 62 is a cylindrical element having a rounded upper face 86 and conical lower face 87 for respectively upwardly and downwardly seating the valve against the lip 80 and circular member 65 as hereinbefore described. A plurality of lengthwise oriented passageways 88 that extend from the center of the bottom of the valve to the side thereof allow the coolant to flow from the upper portion 52 of the guide tube through the central passageway 66, thence longitudinally of the length of the valve and into the axial passageway 83 for causing the control rod to move upwardly within the guide tube. The valve is carried by a stem 84 having one end connected to the top center of the valve and the other end terminated by a circular abutment element 90 threadably mounted thereon. The abutment 90 has one end dished to receive the push rod 71 and the other end provided with an annular recess for holding a valve spring 92 substantially concentrically with the valve stem 84 and in contact with the spring seating surfaces 82 and 82A. The valve is preferably provided with a plurality of longitudinally oriented radial fins 93 which cooperate with the coolant passing through the valve body to centrally dispose the valve therewithin.

As shown in FIG. 3, when the electromagnet 70 is deenergized the spring 92 expands and carries the valve upwardly for seating against the lip 80, equalizing the fluid pressure across the control rod. The control rod 40 thereupon falls into the core under the influence of gravity. The elbow-shaped passageways 67 formed in the circular shaped member 65, allow coolant from the guide tube to aid the spring in unseating the valve and rapidly equalize the pressure across the control rod.

The electromagnet 70 includes a circular housing 72 of generally inverted U-shaped longitudinal section, threadably mounted on a pedestal 73 welded to the reactor head 14. The pedestal 73 includes a hollow tubular section 73A having an enclosed upper end. The tubular section 73A extends into the housing 72 to form an annular chamber 75 for carrying a solenoid coil 74 that is normally energized by a source of current impressed on leads 76. The tubular section encloses a ferromagnetic core 77 integrally connected to the upper end of the push rod 71 and electromagnetically coupled to the coil 74 for carrying the push rod 71 substantially axially of the valve body 61 to actuate the valve 62. It is seen that the ferromagnetic core 77 is of larger circular diameter than the push rod 71, the latter being endwise movable in an elongated collar 78 extending from the reactor head 14 into the bypass chamber 31. The collar 78 acts as a guide for the push rod. The upper end 79 of the collar also acts as a stop for the solenoid core 77 when the head of the reactor is removed, as will hereinafter be more fully described.

In operation, the electromagnet 70 is normally energized either through a manually operated control associated with a source of current, generally represented by schematically in FIGURE 1 at 100, or through an automatic control system that is responsive to reactor conditions, generally represented at 101, or both.

Referring again to FIG. 3, assuming the control rod is in the reactor core 20, when the solenoid coil 74 is energized, the extreme lower end of the push rod, which is in contact with the abutment element 90 of the valve 62, forces the valve downwardly. The spring 92 is compressed as the valve is unseated from the lip 80 and seated on the circular member 65. As the pressure equalizing passageways 67 are closed off, coolant from the outlet chamber 22 flows through the guide tube opening 51, into the guide tube upper end 58, through the valve assembly passageways 66, 88, 83 and 85, and thence into the bypass chamber 31. The coolant impinges on the upper end 41 of the control rod as it flows through the guide tube and carries the control rod upwardly out of the core for seating against the circular member 65. As the control rod is seated, as shown in FIG. 2, the central passageway 66 is closed off and maintained at bypass chamber pressure via the valve assembly passageways 88, 83 and 85. The difference in pressure between the bypass chamber and upper chamber holds the control rod out of the reactor core.

A failure in the current source or sources associated with the manual and/or automatic control arrangements 100, 101, will cause the electromagnet to deenergize. Further, the automatic control system 101 is intended to be representative of any means responsive to any loading condition of the nuclear reactor, or condition of the control circuit itself, that calls for downward movement of a control rod or a plurality of control rods, and/or responds to given reactor conditions by deenergizing a solenoid. Still further, the control system 101 is intended to be representative of control systems that respond to scram condition signals, transmitted thereto by reactor monitors well known in the art, by deenergizing substantially some or all of the solenoid coils associated with the control circuit.

Assuming the control rod is out of the reactor core 20 as shown in FIG. 2, and seated against the circular member 65 as hereinbefore described. When the solenoid coil is deenergized the push rod moves upwardly, relieving the downward force on the valve 62. The spring 92 expands against the lip 80 and unseats the valve from the circular member 65. As the valve is unseated, coolant from the guide tube rapidly flows through the elbow-shaped passageways 67, aiding the spring in seating the valve upwardly against the lip 80 and rapidly flooding the central passageway 66 for equalizing the pressure across the control rod. Under the influence of gravity the control rod falls downwardly into the reactor core as shown in FIG. 3.

It should be noted that the inventive device provides fail-safe operation coupled with simplicity of construction. For example, a failure in the electrical system causes the control rod to fall downwardly into the core; a leak in the reactor that is evidenced by insufficient pressure differential across the control rod to raise the control rod out of the reactor core or maintain the rod so raised will result in scramming the rod; an abnormally high pressure condition in the outlet chamber will cause coolant to flow through the elbow-shaped passageways 67 and seat the valve upwardly against the lip 80, causing the control rod to fall into the core; and a break in the inner head 50 that tends to equalize the pressure between the bypass chamber 31 and outlet chamber 22 will result in insufficient pressure to raise and hold the control rod out of the core.

Maintenance of the control arrangement is facilitated by its simplicity of construction. For example, with the reactor shut down, when the reactor head 14 is removed the electromagnet 70 and push rod 71 are removed therewith since the ferromagnetic core 77 is stopped against the upper end 79 of the collar and prevented from passing therethrough as the reactor head is removed. The entire inner head 30 is thus exposed for ease of maintenance of the valve assemblies 60. Further the valve assemblies 60 may be threadably removed from the upper ends of their respective guide tubes for replacement and repair thereof. In this connection it should be noted that the circular member 65 which is slip-fitted into the counterbore 64 of the valve body is removed with the valve assembly 60, hence the open upper end of the guide tube is exposed for ease of removal of the control rod. It is seen that the extreme upper end of the control rod has an internally threaded recess 49 formed therein. With the valve assembly 60 removed, a T-shaped rod puller (not shown) having a threaded lower end for threadably engaging the threaded recess 49 may be inserted into the guide tube to remove rods for inspection, replacement and renewal. It should be noted that control rods and valve assemblies may be serviced at the same time the electromagnet housings 72 are being removed from the reactor head 14 for inspection replacement and repair of solenoid coils.

The inventive device may also include an indicator 110 comprising a pickup coil 111 associated with the electromagnet 70 that is electromagnetically coupled therewith and electrically connected to an indicator 112 for visually indicating whether the solenoid coil is energized or deenergized.

What is claimed is:

1. In a nuclear reactor having an inlet and an outlet and a first chamber disposed therebetween, the reactor being adapted to have cooling fluid circulated therethrough, and having a reactor core with a movable control rod disposed in the path of fluid flow between the inlet and outlet, an improvement for moving the control rod toward and away from the reactor core, the improvement comprising:

(a) a second chamber disposed above the first chamber and maintained at a lesser pressure than the first chamber, (b) a passageway between the first and second chambers through which sufficient fluid may flow when the passageway is opened to hydraulically move the control rod away from the reactor core, the control rod movably disposed within the passageway, (c) a first means operatively associated with the passageway for closing the passageway to let the control rod remain in the reactor core under the influence of gravity, (d) a second means operably associated with the first means for opening the passageway to allow the fluid to flow therethrough and hydraulically move the control rod away from the reactor core.

2. The improvement according to claim 1 wherein the second means is operably associated with the passageway for maintaining a portion of the passageway open to normally hold the control rod away from the reactor core.

3. The improvement according to claim 1 wherein the first means comprises a spring loaded valve movably disposed within the passageway for maintaining a portion of the passageway open to hold the control rod away from the reactor core when the second means is operated.

4. The improvement according to claim 1 wherein the second means includes a solenoid coil mounted on the reactor externally thereof, and a push rod extending into the first chamber, the push rod being actuated by the solenoid coil to normally operate the first means to move the control rod out of the reactor core and maintain a portion of the passageway open to hold the control rod away from the reactor core.

5. The reactor according to claim 1 having a reactor head, the improvement including an inner head connected to the reactor head and spaced apart therefrom to form therewith the second chamber.

6. The improvement according to claim 1 wherein the passageway is formed by a guide tube having an opening formed therein through which cooling fluid flows, the guide tube having an upper end that protrudes into the second chamber, a valve assembly mounted on the upper end of the tube, the valve assembly having a valve body that extends the passageway, and wherein the first means is a valve endwise movable in the valve body.

7. The reactor according to claim 5 wherein the passageway is formed by a guide tube having an opening formed therein for fluid communication with the first chamber, the guide tube having an upper portion carried by the inner head and a lower portion carried by the reactor core, the first means being a valve assembly having a spring loaded valve mounted for closing the passageway, and the second means being an externally actuated push rod associated with the valve for normally unseating the valve to open the passageway, the push rod being movable for closing the passageway.

8. The improvement according to claim 5 including a bypass conduit extending from the second chamber and externally of the reactor for adaptation to a pressure source maintained at a lesser pressure than the first chamber.

9. The improvement according to claim 5 wherein the reactor head is removably mounted to easily expose the first means, the first means is removably mounted on upper end of the passageway, the second means is removably mounted on the reactor head, and the control rod is adapted to be removed from the passageway.

10. The improvement according to claim 5 wherein the first means is a valve mounted in the passageway, the second means is an electromagnet having a ferromagnetic core, the electromagnet is mounted on the reactor head, and the ferromagnetic core is adapted to carry a push rod within the second chamber for operating the valve.

References Cited

UNITED STATES PATENTS 3,347,747 10/1967 West et al. ---------- 176—35

FOREIGN PATENTS 612,009 1/1961 Canada.
1,208,834 1/1966 Germany.

CARL D. QUARFORTH, Primary Examiner

H. E. BEHREND, Assistant Examiner